Aug. 25, 1964    M. J. CEGLIA    3,146,298
ELECTRICAL DISTRIBUTION SYSTEM
Filed Jan. 12, 1960    2 Sheets-Sheet 1

*INVENTOR.*
MICHAEL J. CEGLIA
BY Arthur H. Seidel
ATTORNEY

3,146,298
ELECTRICAL DISTRIBUTION SYSTEM
Michael J. Ceglia, Haddonfield, N.J., assignor, by mesne assignments, to Base Engineering Development Company, Philadelphia, Pa., a corporation of Pennsylvania
Filed Jan. 12, 1960, Ser. No. 2,007
6 Claims. (Cl. 174—49)

The present invention relates to an electrical distribution system, and more particularly to a bus duct and panel board assembly.

In the construction of large buildings, such as apartment buildings, it is necessary to provide a plurality of individual electrical systems all connected to a main distribution system. For example, in an apartment building each apartment must have its own individual electrical system which is connected through a separate panel board or fuse box to a main distribution system, such as bus bars extending through a bus duct. In the construction of such a distribution system, it is desirable to assemble the panel boards or fuse boxes and the main distribution system such that the system cannot only be easily constructed originally, but also permits ease of maintenance of the system.

It is an object of the present invention to provide a novel electrical distribution system.

It is another object of the present invention to provide a novel bus duct and panel board assembly.

It is still another object of the present invention to provide a novel assembly for mounting a pair of panel boards or fuse boxes on a bus duct which permits ease of access to the electrical connection between either panel board and the bus bars in the bus duct.

It is a further object of the present invention to provide a novel assembly of bus bars and the electrical connections thereto.

It is yet another object to provide a means of furring-in, or enclosing in a wall, a bus duct distribution system so that the system, generally, is hidden from sight and will yet comply with all applicable present laws, ordinances, and codes.

Other objects will appear hereinafter.

For the purpose of illustrating the invention there is shown in the drawings a form which is presently preferred; it being understood, however, that this invention is not limited to the precise arrangements and instrumentalities shown.

Figure 1:
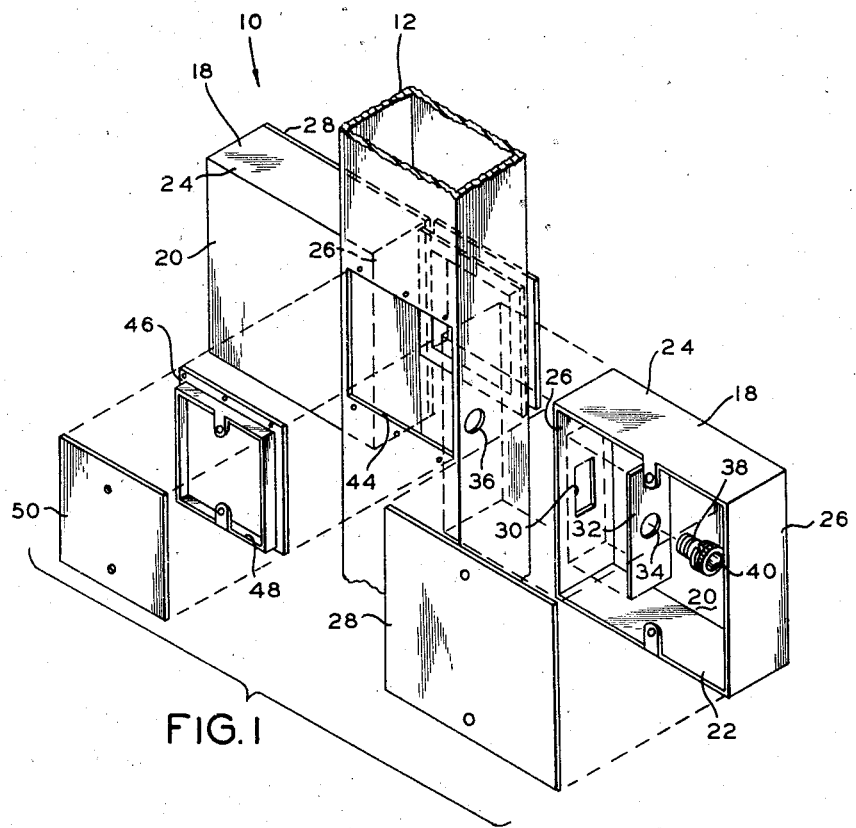
FIGURE 1 is a perspective view, partially exploded, of the electrical distribution system of the present invention.

Referring initially to FIGURE 1, the electrical distribution system of the present invention is generally designated as 10.

Figure 2:
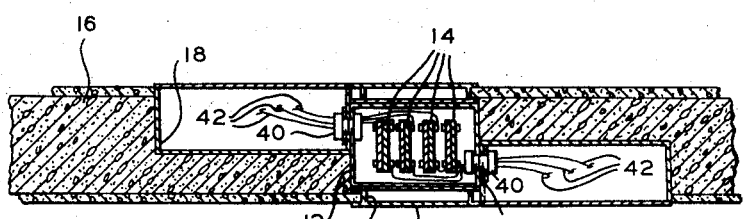
FIGURE 2 is a transverse sectional view of the electrical distribution system of the present invention.

The electrical distribution system 10 comprises a duct 12 through which a plurality of bus bars 14 extend. In the illustrated embodiment shown in FIGURE 2, four bus bars 14 extend through the duct 12. However, the duct 12 may contain any number of the bus bars 14 according to the needs of the particular electrical system. As shown in FIGURE 2, the bus duct 12 extends upwardly through a vertical wall 16 of a building. In an apartment building, it is preferable that the bus duct 12 extend through a wall 16 which is common to two separate apartments on each floor of the building.

At each floor of the building a pair of outlet boxes 18 are secured to opposite sides of the bus duct 12, and are mounted within the wall 16. Each of the outlet boxes 18 comprises a back wall 20, a bottom wall 22, a top wall 24, and a pair of side walls 26. The front of each of the boxes 18 is open, and a cover plate 28 may be provided for securement across the front of the box 18. Each of the boxes 18 is adapted to support a distribution panel board, not shown, which includes either fuses or circuit breakers.

One of the side walls 26 of each of the boxes 18 has a substantially rectangular opening 30 therethrough. A clamping plate 32 extends along the inner surface of the side wall 26 having the opening 30 therethrough. The clamping plate 32 is larger than the opening 30, and has a circular hole 34 therethrough which is smaller than the opening 30. The side wall 26 of the box 18 having the opening 30 therethrough is mounted against the side of the bus duct 12 with the opening 30 being in alignment with a circular hole 36 in the side of the bus duct 12. The hole 36 in the bus duct 12 is of a diameter equal to the hole 34 through the clamping plate 32. A threaded pipe nipple 38 extends through the hole 34 in the clamping plate 32, the opening 30 in the side wall 26 of the box 18, and the hole 36 in the side wall of the bus duct 12. The pipe nipple 38 is of a diameter substantially equal to the diameter of the holes 34 and 36. A separate nut 40 is threaded on each end of the pipe nipple 38. Thus, the nuts 40 clamp the clamping plate 32, side wall 26 of the box 18 and the side wall of the bus duct 12 therebetween so as to secure the outlet box 18 to the bus duct 12. Since the opening 30 in the side wall 26 of the box 18 is larger than the diameter of the pipe nipple 38, the position of the outlet box 18 with respect to the bus duct 12 and the wall 16 can be adjusted so that the front of the outlet box 18 is flush with a surface of the wall 16.

Three separate wires 42 extend through each of the pipe nipples 38 between the bus duct 12 and each of the outlet boxes 18. One end of each of the wires 42 is connected to a separate one of the bus bars 14, and the other ends of the wires 42 are connected to the distribution panel board within the box 18. The outlet boxes 18 are mounted on the bus duct 12 so that each of the outlet boxes 18 opens to a different side of the wall 16. Thus, in an apartment building where the wall 16 is a common wall between two apartments, each of the boxes 18 provides the distribution panel board and fuse box for the electrical system of a separate apartment.

The bus duct 12 has aligned rectangular openings 44 in its sides which are parallel to the surfaces of the wall 16. The openings 44 are in horizontal alignment with the outlet boxes 18. A separate frame 46 is secured to the outer side of the bus duct 12 around each of the openings 44. Each of the frames 46 has a flange 48 projecting away from the bus duct 12 around the inner edge of the frame 46. A cover plate 50 is removably secured across the outer edge of the flange 48 of each of the frames 46. As shown in FIGURE 2, the flanges 48 of the frames 46 are of a length to position the cover plates 50 along the outer surfaces of the wall 16. The openings 44 provide access into the bus duct 12 to permit the wires 42 to be connected to the bus bars 14. Thus, each of the outlet boxes 18 has its own door to the interior of the bus duct 12 so that any repairs to the electrical connection between the distribution panel board of the outlet box 18 and the bus bars 14 can be made directly from the apartment which is serviced by the particular distribution panel board. By having two outlet boxes 18 mounted at the same level on the bus duct 12, the original construction of the electrical distribution system 10 is greatly simplified.

Figure 3:
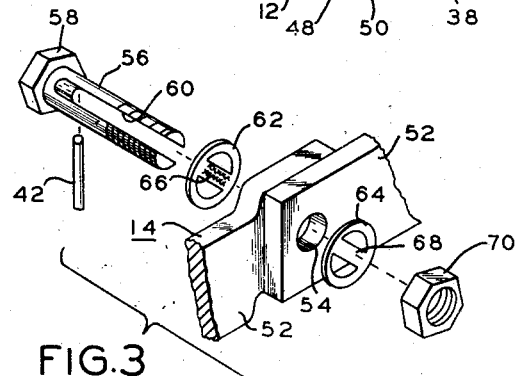
FIGURE 3 is an exploded perspective view of the bus bar assembly and the electrical connection thereto of the present invention.

Each of the bus bars 14 comprises a plurality of elongated sections 52 connected in longitudinal alignment with the ends of adjacent sections 52 overlapping, as shown in FIGURE 3.

The sections 52 of the bus bars 14 are of a length so that the connections between the sections 52 are at each floor of the building and in alignment with the door openings 44 in the bus duct 12. The overlapping ends of the bus bar sections 52 are provided with aligned holes 54 therethrough. A bolt 56 extends through each pair of aligned holes 54. The bolt 56 has a head 58 on one end thereof, and a slot 60 extends axially along the bolt 56 from the free threaded end of the bolt. The slot 60 extends diametrically across the bolt 56 and extends axially of the bolt 56 to a point adjacent the head 58. A pair of washers 62 and 64 are provided around the bolt 56 on opposite sides of the overlapped ends of the bus bar sections 52. The washers 62 and 64 are provided with bridges 66 and 68 respectively which extend diametrically across the washers 62 and 64. The bridges 66 and 68 are of a width substantially equal to the width of the slot 60 in the bolt 56 so that the bridges 66 and 68 extend across the slot 60 when the bolt 56 is inserted through the washers 62 and 64. The surfaces of the bridge 66 of the washer 62 are serrated so that the bridge 66 is provided with sharp biting edges. When the bolt 56 is inserted through the washers 62 and 64 and the holes 54 in the bus bar sections 52, a nut 70 is threaded on the free end of the bolt 56 to secure the sections 52 of the bus bar 14 together. The bridge 68 of the washer 64 prevents the split arms of the bolt 56 from being squeezed together so that the nut 70 can be readily threaded on the bolt 56.

In addition to securing the sections 52 of the bus bars 14 together, the bolts 56 also secure the ends of the wires 42 to the bus bars 14. Prior to completely tightening the nut 70 on the bolt 56, the end of a wire 42 is inserted through the slot 60 in the bolt 56 at the bottom end of the slot 60. Thus, when the nut 70 is tightened on the bolt 56, the wire 42 will be clamped between the bottom of the slot 60 and the bridge 66 of the washer 62. The serrated edges of the bridge 66 of the washer 62 will bite into the wire 42 and the bus bar section 52 to insure good electrical contact between the wire 42 and the bus bar 14. In addition, the bridge 66 of the washer 62 prevents the wire 42 from being pulled into the hole 54, and possibly being sheared off by the edges of the hole 54. By having the connections between the sections 52 of the bus bars 14 at the level of the openings 44 in the bus duct 12, the connections between the sections 52 are easily accessible for originally installing the bus bars 14 in the bus duct 12, and for ease of attachment of the wires 42 to the bus bars 14. As shown in FIGURE 2, the sections 52 of each of the bus bars 14 are connected by a pair of the bolts 56 so that the wires 42 from each of the boxes 18 can be readily secured to the bus bars 14 from the apartment which is being serviced by the particular outlet box 18.

Figure 4:
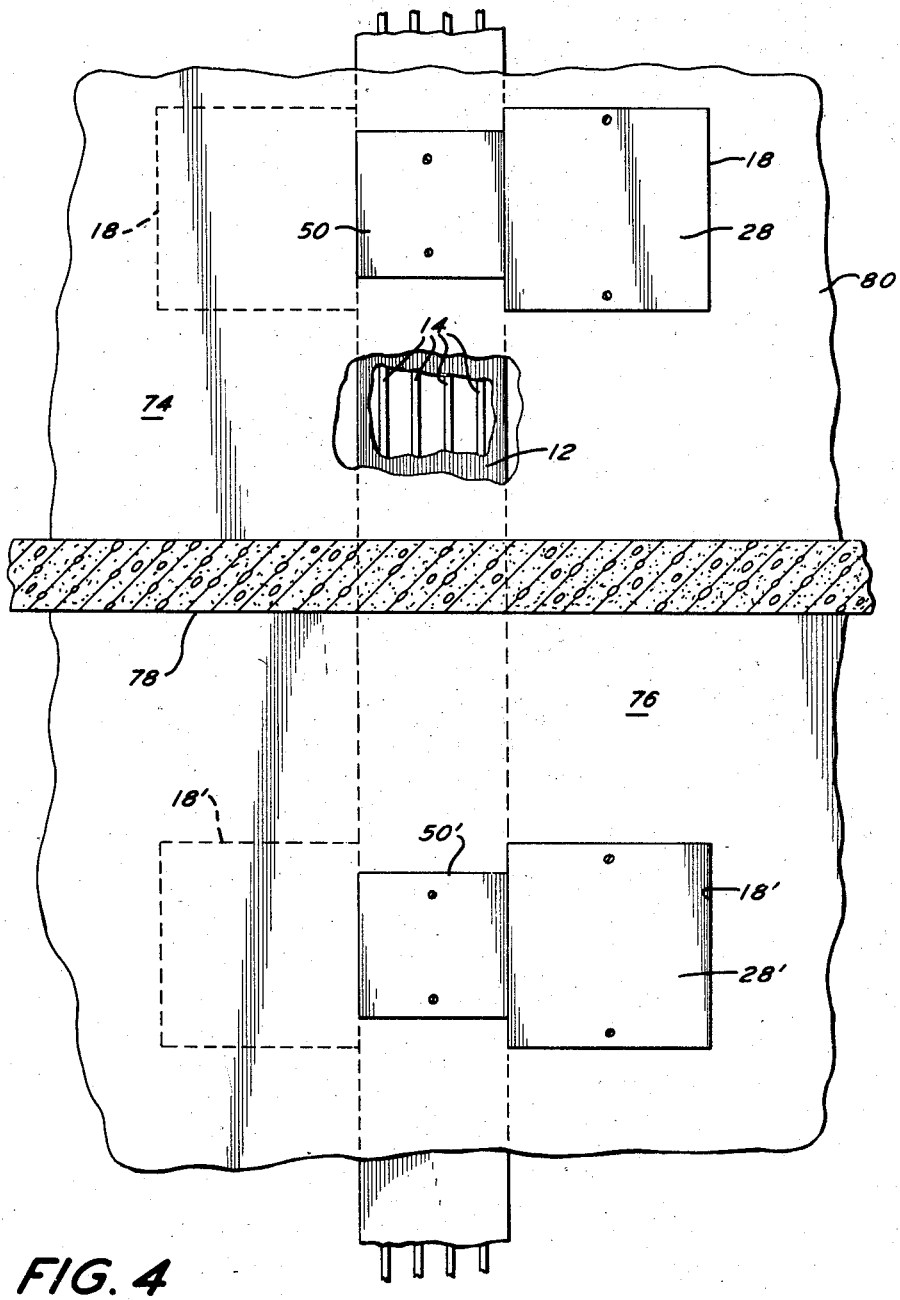
FIGURE 4 is a cross sectional view of two floors of an apartment building utilizing the electrical distribution system of the present invention.

In FIGURE 4, there is shown two apartments 74 and 76 separated by a ceiling and floor 78. The apartment 74 has a wall 80 vertically aligned with the wall 82 of apartment 76. Bus duct 12 extends vertically within the walls 80 and 82. The bus duct 12 has its cover 50 at one horizontal level on the wall 80. On opposite sides of the bus duct 12 there is supported the outlet boxes 18. Only one outlet box 18 with its cover plate 28 can be seen within the apartment 74. A similar cover plate 50' is provided in the wall 82 of apartment 76 at a second horizontal level. Spaced adjacent the cover plate 50' are the outlet boxes 18' similar to the outlet boxes 18 discussed previously. Only the cover plate 28' of one of the outlet boxes 18' can be seen within the apartment 76. As was stated previously, the sections 52 of the bus bars 14 are of a length so that the connections between the sections 52 are in alignment with the cover plates 50 and 50'.

The present invention may be embodied in other specific forms without departing from the spirit or essential attributes thereof and, accordingly, reference should be made to the appended claims, rather than to the foregoing specification as indicating the scope of the invention.

I claim:

1. An electrical distribution system including a bus duct, a bus bar extending through said bus duct, a pair of boxes mounted in opposed relation on opposite sides of said bus duct, each of said boxes having an open side with the open side of said boxes facing in opposite directions, each of said boxes having one side perpendicular to said open side, each of said box one sides being juxaposed in side by side surface contact to a side of said bus duct, and a pair of wires connected to said bus bar, one of said wires extending from said bus bar through said one side of said boxes and the other of said wires extending through said one side of said other box.

2. An electrical distribution system including a bus duct, a bus bar extending through said bus duct, a pair of boxes mounted in opposed relation on opposite sides of said bus duct, each of said boxes having an open side with the open side of said boxes facing in opposite directions, each of said boxes having one side perpendicular to said open side, each of said box one sides being juxaposed in side by side surface contact to a side of said bus duct, and a pair of wires connected to said bus bar, one of said wires extending from said bus bar to said one side of one of said boxes and the other of said wires extending through one side of said other box, said one side of each box having an opening therethrough, the side of the bus duct having a hole therethrough, a clamping plate seated against the inner surface of said one side of the box and across the opening in said box one side, said clamping plate having a hole therethrough, a threaded nipple extending through the holes in the clamping plate and said side of the bus duct and the opening in said one side of the box, and a pair of nuts threaded on the end of the nipple and clamping the clamping plate, said one side of said box and said side of said bus duct therebetween.

3. An electrical distribution system including a bus duct, a bus bar extending through said bus duct, a pair of boxes mounted in opposed relation on opposite sides of said bus duct, each of said boxes having an open side with the open side of said boxes facing in opposite directions, each of said boxes having one side perpendicular to said open side, each of said box one sides being juxaposed in side by side surface contact to a side of said bus duct, and a pair of wires connected to said bus bar, one of said wires extending from said bus bar through said one side of said boxes and the other of said wires extending through said one side of said other box, the other side of said bus duct having openings therethrough which are between the boxes, and a separate cover removably secured across each of the openings.

4. In an apartment building having a wall which is common to two adjacent apartments, an electrical distribution system including a bus duct extending through said wall, a pair of boxes mounted in opposed relation on opposite sides of said bus duct and within said wall, each of said boxes having one side mounted against a side of said bus duct, each of said boxes having an open front with the open fronts of the boxes being along opposite sides of the wall, said box open fronts being perpendicular to said box one side, a plurality of bus bars extending through said bus duct, and a separate pair of wires connected to each of said bus bars, one of the wires from each of said bus bars extending into one of said boxes and the other wire from each of said bus bars extending into the other box.

5. An electrical distribution system for a building comprising an upright bus duct adapted to be placed in the walls of a building, first and second boxes having a first side attached to first and second opposite sides of said bus duct at a first horizontal level along said bus duct, third and fourth boxes having a first side attached to said first and second opposite sides of said bus duct at a second horizontal level along said bus duct, at least one bus bar mounted in said duct having a length substantially equal to the distance between said first and second levels, wiring means for connecting the ends of said one bus duct at said first and second levels through said first and second sides of said bus duct and said first side of said boxes into said boxes, said first and second boxes each having a second side perpendicular to said box's first side and parallel with opposite sides of said wall, said third and fourth boxes each having a second side perpendicular to said box's first side and parallel with opposite sides of said wall, and cover means for providing an opening in the said second side of each of said first, second, third and fourth boxes.

6. The electrical distribution system of claim 5 wherein said bus duct has third and fourth sides parallel with opposite sides of said wall, and entry means for providing access through one of said third and fourth sides of said bus bar.

References Cited in the file of this patent

UNITED STATES PATENTS

| | | |
|---|---|---|
| 832,612 | Kalischer | Oct. 9, 1906 |
| 834,669 | Fricke | Oct. 30, 1906 |
| 895,362 | Goldschmidt | Aug. 4, 1908 |
| 1,515,324 | Arnold et al. | Nov. 11, 1924 |
| 1,795,062 | Warner | Mar. 3, 1931 |
| 1,805,874 | Lang et al. | May 19, 1931 |
| 2,041,675 | Frank et al. | May 19, 1936 |
| 2,049,409 | Dibner | July 28, 1936 |
| 2,261,857 | Novak et al. | Nov. 4, 1941 |
| 2,297,862 | Bachmann | Oct. 6, 1942 |
| 2,547,663 | Rogoff | Apr. 3, 1951 |
| 2,619,828 | Wiesmann | Dec. 2, 1952 |
| 2,626,301 | Hammerly | Jan. 20, 1953 |
| 2,635,312 | McCullough | Apr. 21, 1953 |
| 2,725,541 | Born et al. | Nov. 29, 1955 |
| 2,866,960 | Howell et al. | Dec. 30, 1958 |
| 2,963,826 | Snider et al. | Dec. 13, 1960 |